(12) United States Patent
Yamane et al.

(10) Patent No.: US 11,138,369 B2
(45) Date of Patent: Oct. 5, 2021

(54) EXPERIMENT INFORMATION MANAGEMENT SYSTEM, EXPERIMENT NOTE SYSTEM, AND EXPERIMENT INFORMATION MANAGEMENT METHOD

(71) Applicant: OLYMPUS CORPORATION, Hachioji (JP)

(72) Inventors: Takuto Yamane, Tokyo (JP); Toshiyuki Hattori, Tokyo (JP); Yoshihiro Ue, Tokyo (JP); Ryoji Kitamura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/549,922

(22) Filed: Aug. 23, 2019

(65) Prior Publication Data

US 2020/0065363 A1 Feb. 27, 2020

(30) Foreign Application Priority Data

Aug. 27, 2018 (JP) .............................. JP2018-158158

(51) Int. Cl.
*G06F 40/174* (2020.01)
*G02B 21/36* (2006.01)
*G06T 11/60* (2006.01)
*G06F 40/166* (2020.01)
*G02B 21/00* (2006.01)
*G06F 17/00* (2019.01)

(52) U.S. Cl.
CPC ......... *G06F 40/174* (2020.01); *G02B 21/367* (2013.01); *G06T 11/60* (2013.01); *G02B 21/00* (2013.01); *G06F 40/166* (2020.01)

(58) Field of Classification Search
CPC ... G06F 40/174; G06F 40/166; G02B 21/367; G02B 21/00; G06T 11/60
See application file for complete search history.

(56) References Cited

U.S. PATENT DOCUMENTS

| 6,499,054 | B1 | 12/2002 | Hesselink et al. |
| 2003/0036815 | A1 | 2/2003 | Krishnamurthy et al. |
| 2008/0288455 | A1 | 11/2008 | Sato et al. |
| 2013/0187954 | A1* | 7/2013 | Saito ..................... G02B 21/365 345/634 |
| 2016/0203186 | A1* | 7/2016 | Tanikawa ........... G06K 9/00147 707/758 |

(Continued)

FOREIGN PATENT DOCUMENTS

| JP | 2003517229 | 5/2003 |
| JP | 2005520225 | 7/2005 |

(Continued)

*Primary Examiner* — Quoc A Tran
(74) *Attorney, Agent, or Firm* — Holtz, Holtz & Volek PC

(57) ABSTRACT

An experiment information management system includes a first experiment apparatus configured to generate first experiment result information and first log data; a recording apparatus configured to record the first experiment result information and the first log data generated in the first experiment apparatus; and an experiment note generation apparatus configured to generate an experiment note being a record of an experiment, according to at least the first experiment result information and the first log data recorded in the recording apparats.

11 Claims, 22 Drawing Sheets

(56) References Cited

U.S. PATENT DOCUMENTS

2018/0032549 A1* 2/2018 Natsume ................. G06F 16/26
2018/0190386 A1* 7/2018 Yoshikawa ............ G16H 40/40

FOREIGN PATENT DOCUMENTS

| JP | 2008083806 A | 4/2008 |
| JP | 2012113468 A | 6/2012 |
| JP | 2014160423 A | 9/2014 |
| JP | 2015065822 A | 4/2015 |
| JP | 2015082097 A | 4/2015 |
| JP | 2016031698 A | 3/2016 |

* cited by examiner

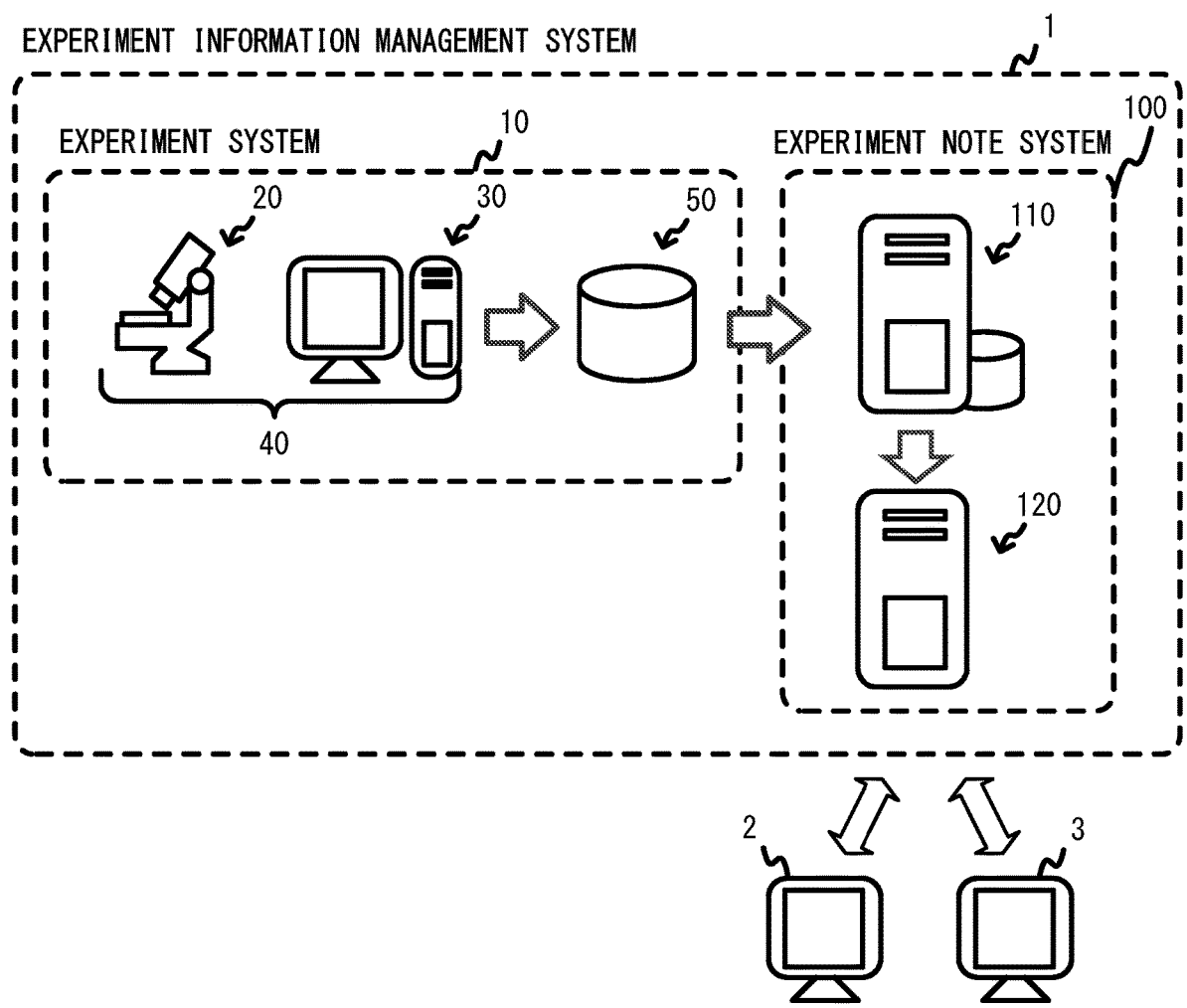
F I G. 1

| USER ID | PASSWORD |
|---|---|
| 10000001 | ****** |
| 10000002 | ****** |
| 10000003 | ****** |
| 10000004 | ****** |
| : | : |

50a

F I G. 5

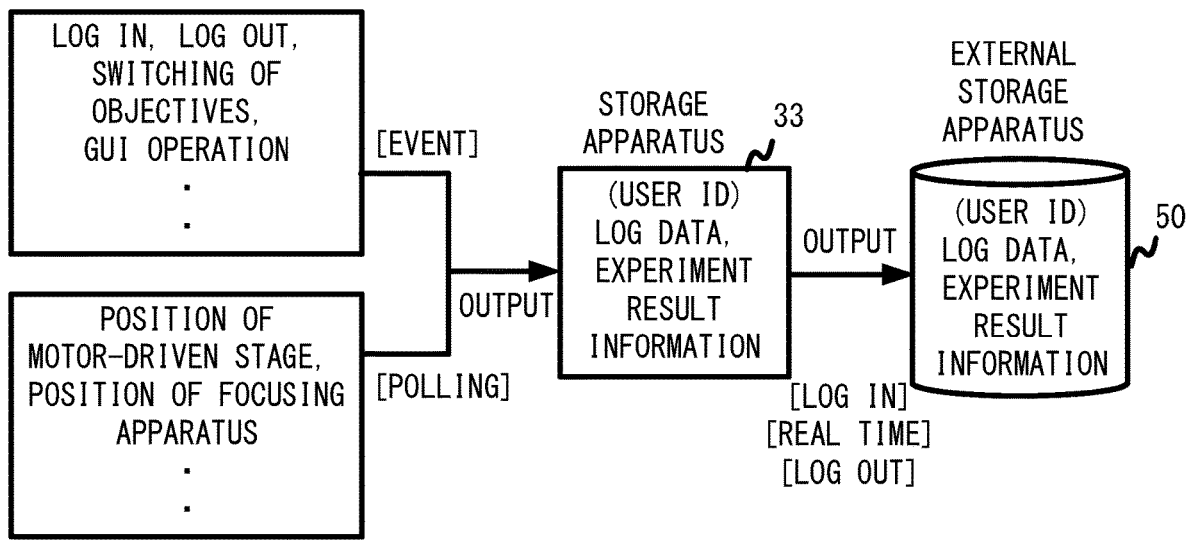
F I G. 6

| OUTPUT DATE/TIME | OUTPUT SOURCE | TYPE | DESCRIPTION |
|---|---|---|---|
| 03/20/2018 12:48:12.2180007825 | CONTROL APPARATUS | [Debug] | LOG IN USER ID : 10000001 FACILITY ID : ***** |
| 03/20/2018 12:49:56.1239945681 | CONTROL APPARATUS | [Debug] | MICROSCOPE SOFTWARE LAUNCH |
| 03/20/2018 12:49:59.4450135623 | PHOTODETECTOR 1 | [Debug] | IMAGE CAPTURING START DETECTOR SENSITIVITY*** |
| 03/20/2018 12:48:59.1840012328 | LASER 1 | [Debug] | LIGHT EMISSION START LASER INTENSITY*** |
| 03/20/2018 12:50:22.1580011115 | CONTROL APPARATUS | [Debug] | IMAGE GENERATION OUTPUT PATH*** |
| : | : | : | : |

50b

F I G. 7

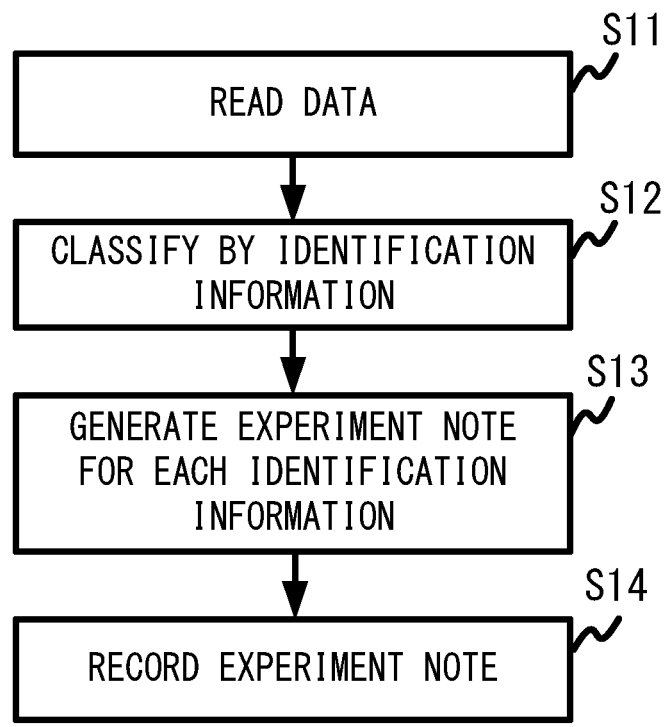
F I G. 9

113a

| USER ID | PASSWORD | AUTHORITY |
|---|---|---|
| 10000001 | ******* | ACCESS AUTHORITY : ****/ UPDATE AUTHORITY : **** |
| 10000002 | ******* | ACCESS AUTHORITY : ****/ UPDATE AUTHORITY : **** |
| : | : | : |

FIG. 11

EXPERIMENT 1                    N1

EXPERIMENT DATE : 2017/02/22
FACILITY : RESEARCH CENTER A
PURPOSE : OBSERVATION OF SHAPE
OBSERVATION APPARATUS : ABC1000
OBJECTIVE : XYZ25x
OBSERVATION : 1. "cell_A_001.img"
              2. " cell_A_002.img"

EXPERIMENT 2                    N2

EXPERIMENT DATE : 2017/03/16
FACILITY : RESEARCH CENTER A
PURPOSE : OBSERVATION OF BRIGHTNESS
OBSERVATION APPARATUS : ABC1000      R2
OBJECTIVE : XYZ25x

EXCITATION LIGHT INTENSITY : 60%
DETECTOR SENSITIVITY : 500V

OBSERVATION : 1. "cell_B_001.img"
              2. " cell_B_002.img"

F I G. 1 3

| | | | |
|---|---|---|---|
| NO. 2 | | EXPERIMENTER | ****** ▽ |

EXPERIMENT TITLE: CELL COUNT SURVEY

EXPERIMENT DATE: 2017/02/21   FACILITY: RESEARCH CENTER A

EXPERIMENT PURPOSE: COUNT THE NUMBER OF LIVING CELLS

EXPERIMENT CONDITIONS:

EXPERIMENT APPARATUS: ABC50

OBJECTIVE: XYZ2×

EXPERIMENT RESULT : 1. TIME OF MEASUREMENT : 12:03  Live cells:108
EXPERIMENT RESULT : 2. TIME OF MEASUREMENT : 12:04  Live cells: 99
EXPERIMENT RESULT : 3. TIME OF MEASUREMENT : 12:05  Live cells: 98
EXPERIMENT RESULT : 4. TIME OF MEASUREMENT : 12:06  Live cells: 95

FIG. 14

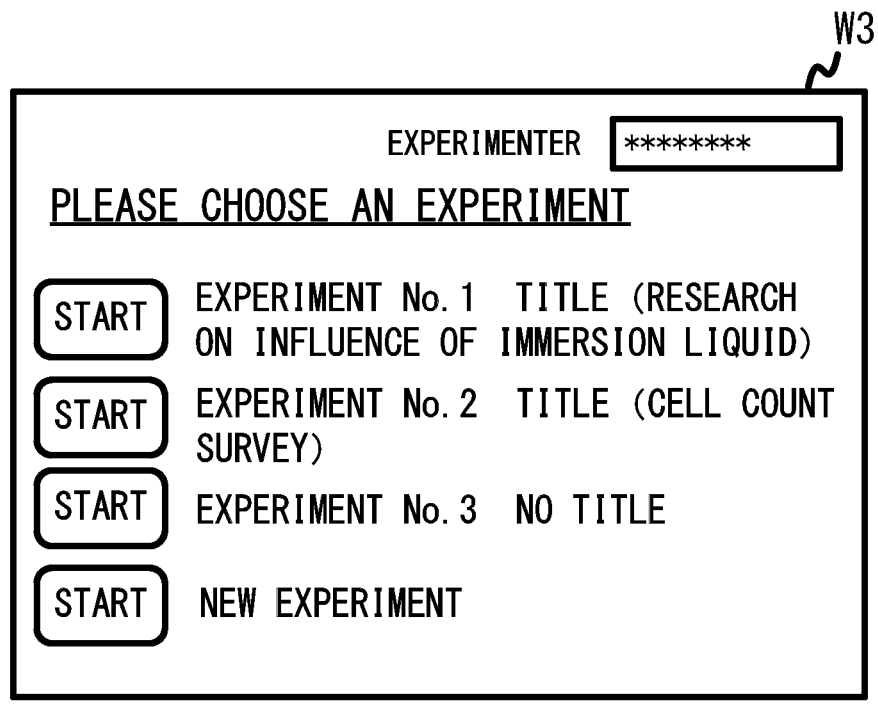
F I G. 1 5

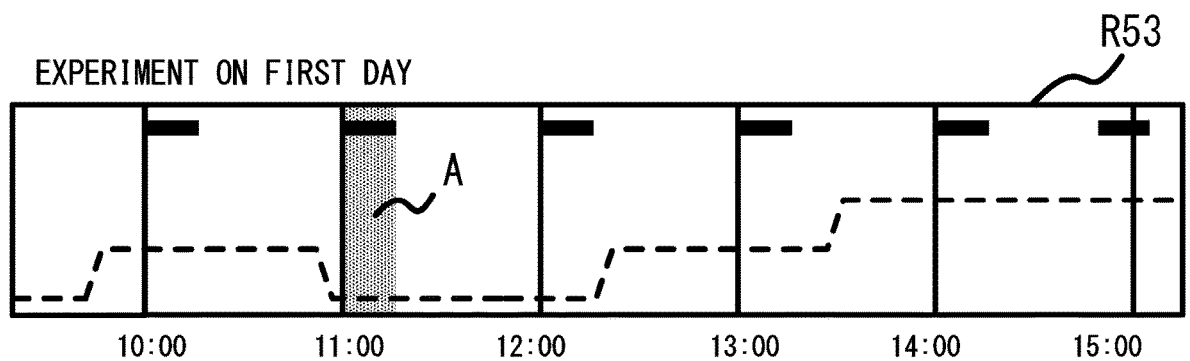
F I G. 1 8 A
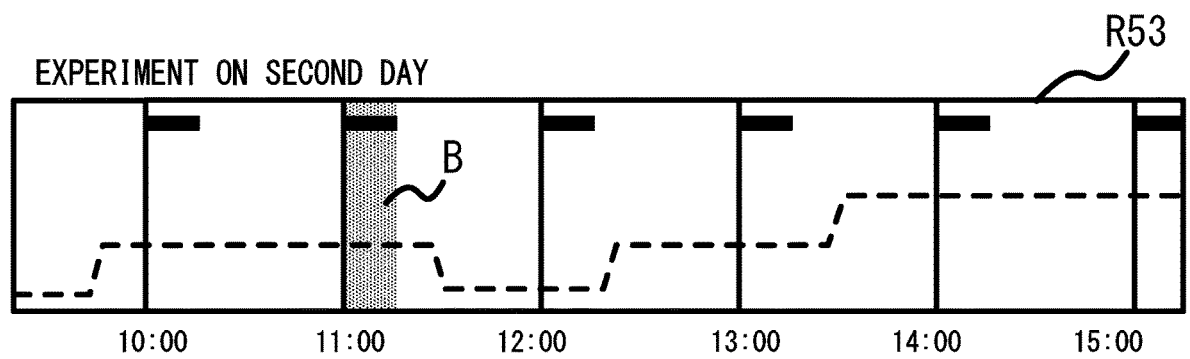
F I G. 1 8 B

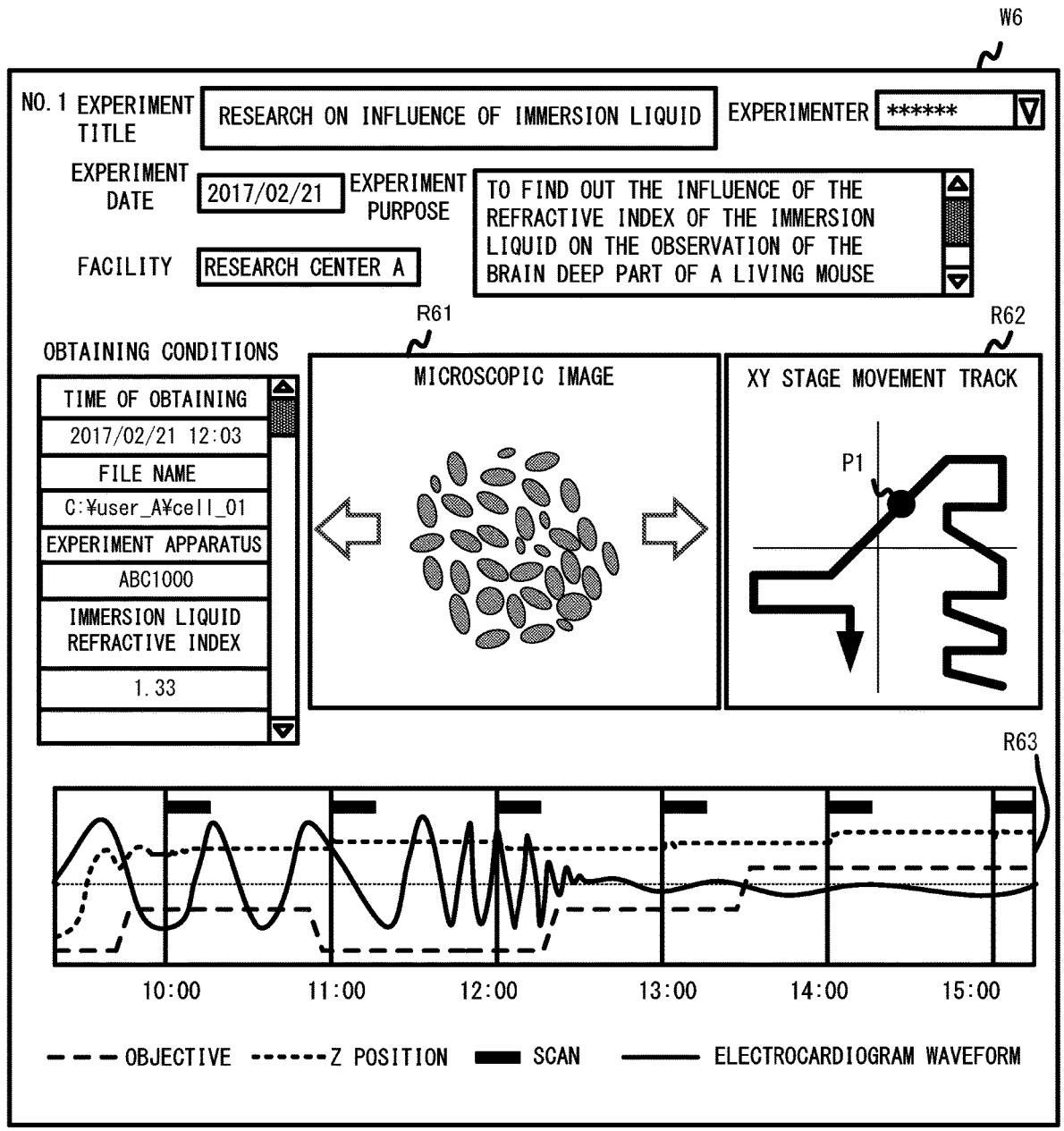
F I G. 19

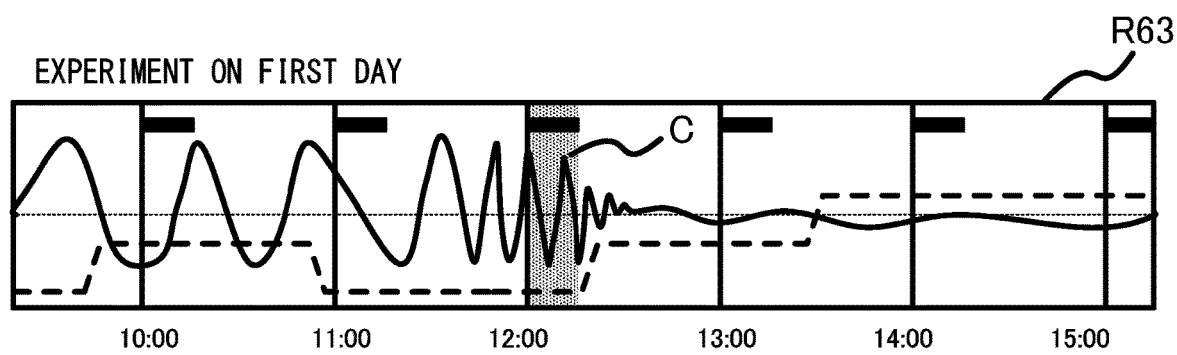
F I G. 20A
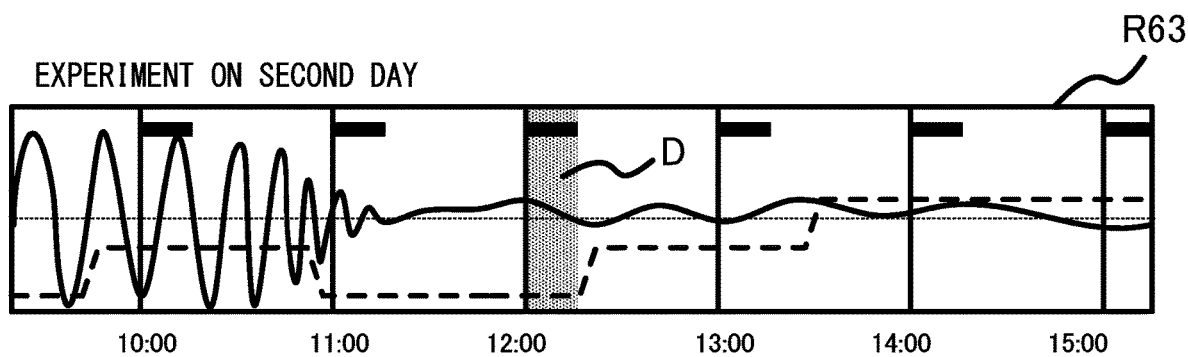
F I G. 20B

EXPERIMENT INFORMATION MANAGEMENT SYSTEM, EXPERIMENT NOTE SYSTEM, AND EXPERIMENT INFORMATION MANAGEMENT METHOD

CROSS REFERENCE TO RELATED APPLICATIONS

This application is based upon and claims the benefit of priority from prior Japanese Patent Application No. 2018-158158, filed Aug. 27, 2018, the entire contents of which are incorporated herein by this reference.

FIELD

The embodiments disclosed herein relate to an experiment information management system, an experiment note system, and an experiment information management method.

BACKGROUND

Experiment notes being the records of experiments are important resource related to research activities, and effective utilization of experiment notes has been desired. However, conventionally, experimenters themselves create experiment notes by recording various information related to experiments, and therefore, the amounts of entry and entry items of the notes vary between experimenters. For this reason, it is difficult to compare and reproduce experiments using experiment notes, making it impossible to effectively utilize experiment notes.

A technique related to this technical issue described above is disclosed in Japanese Laid-open Patent Publication No. 2008-083806, for example. Japanese Laid-open Patent Publication No. 2008-083806 describes a system for easily digitizing experiment notes. The system disclosed in Japanese Laid-open Patent Publication No. 2008-083806 checks whether all the mandatory entry items have been entered, and if they have not been entered, a dialog is displayed to prompt the experiment note to be created again. Thus, it becomes possible to prevent omissions of mandatory entry items.

SUMMARY

An experiment information management system according to an aspect of the present invention includes a first experiment apparatus configured to generate first experiment result information and first log data; a recording apparatus configured to record the first experiment result information and the first log data generated in the first experiment apparatus; and an experiment note generation apparatus configured to generate an experiment note being a record of an experiment, according to at least the first experiment result information and the first log data recorded in the recording apparats.

An experiment note system according to an aspect of the present invention includes an experiment note generation apparatus configured to generate an experiment note being a record of an experiment according to at least first experiment result information and first log data generated in a first experiment apparatus; and a screen generation apparatus configured to generate an experiment note display screen according to at least the experiment note generated in the experiment note generation apparatus.

An experiment information management method according to an aspect of the present invention includes obtaining first experiment result information and first log data generated in a first experiment apparatus; and generating an experiment note being a record of an experiment according to at least the first experiment result information and the first log data.

BRIEF DESCRIPTION OF DRAWINGS

FIG. 1 illustrates a configuration of an experiment information management system 1 according to the first embodiment as an example.

FIG. 5 illustrates a table 50a for authentication in the experiment system 10 as an example.

FIG. 6 is a drawing for explaining the timings of obtaining and recording experiment information.

FIG. 7 illustrates log data recorded in an external storage apparatus 50 as an example.

FIG. 9 is a flowchart of an experiment notes generation process performed in the experiment note system 100.

FIG. 11 illustrates a table 113a for authentication permission control of the experiment note system 100 as an example.

FIG. 13 illustrates conventional experiment notes as an example.

FIG. 14 illustrates another example of an experiment note display screen.

FIG. 15 illustrates an example of an experiment selection screen.

FIG. 18 is a drawing for explaining how to use the experiment note display screen illustrated in FIG. 17.

FIG. 19 illustrates yet another example of an experiment note display screen.

FIG. 20A is a drawing for explaining how to use the experiment note display screen illustrated in FIG. 19.

FIG. 20B is a drawing for explaining how to use the experiment note display screen illustrated in FIG. 19.

DESCRIPTION OF EMBODIMENTS

Figure 2:
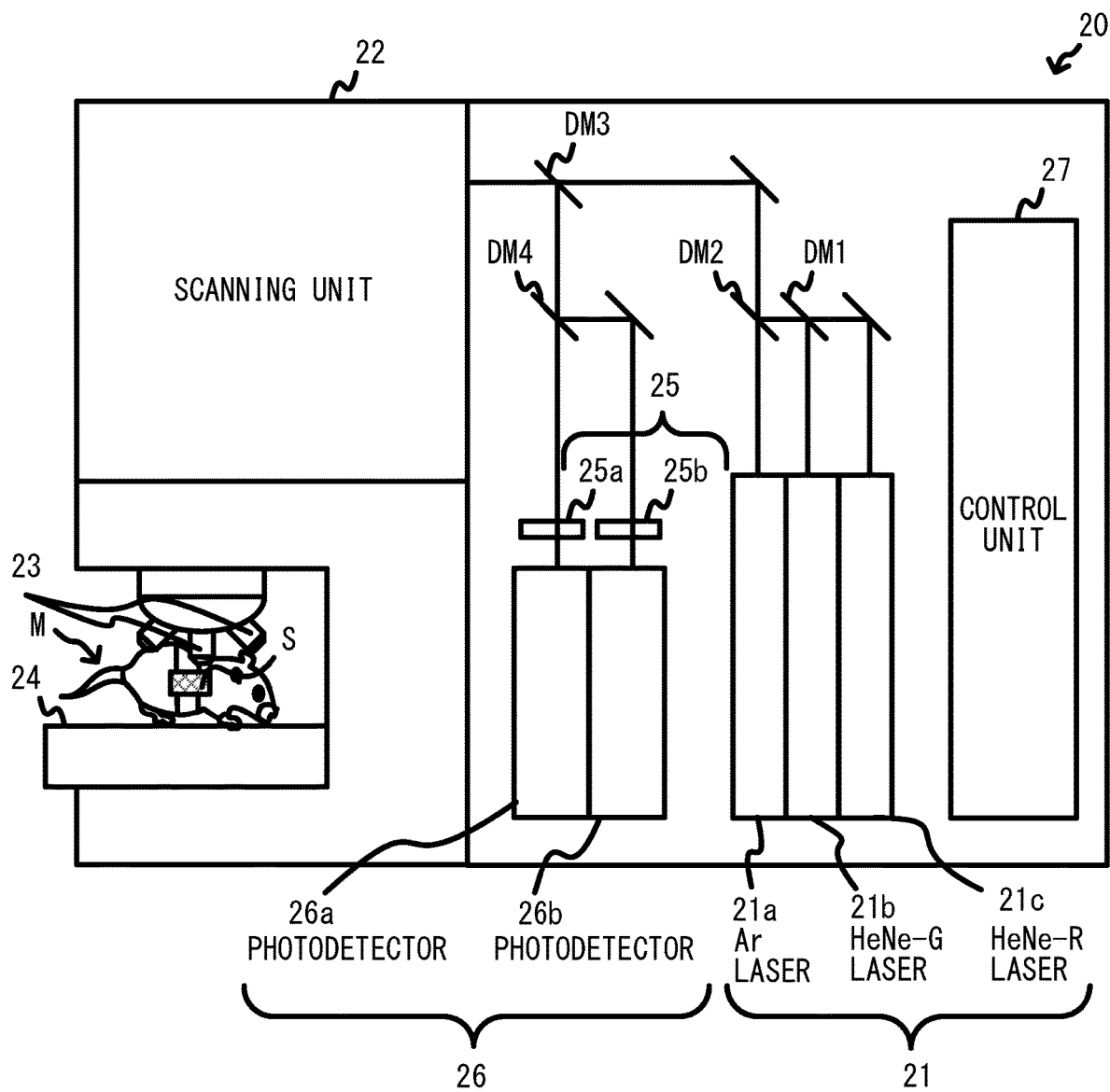
FIG. 2 illustrates a configuration of a microscope 20 as an example.

In the system disclosed in Japanese Laid-open Patent Publication No. 2008-083806, experiment notes can be digitized, but the input of entry items needs to be done by experimenters. For this reason, experimenters need to keep records constantly during experiments, which prevents them from concentrating on the operations of the experiments and the studies of experiment results, and so on. In addition, when multiple experiments are conducted parallelly in terms of time, it may be impossible to keep all the necessary records.

First Embodiment

FIG. 1 illustrates a configuration of an experiment information management system 1 according to this embodiment as an example. The experiment information management system 1 illustrated in FIG. 1 is a system that manages experiment information and includes an experiment system 10 and an experiment note system 100. Meanwhile, explanation is made below using an example of a biological experiment using a living subject such as a mouse M (see FIG. 2) as a specimen, but the management target of the experiment information management system 1 is not limited to biological experiment information.

First, the experiment system 10 is explained. The experiment system 10 is a system that the experimenter uses in an experiment and includes a microscope apparatus 40 and an external storage apparatus 50. The microscope apparatus 40 is a first experiment apparatus of the experiment system and includes a microscope 20 and a microscope control apparatus 30 that is a computer that controls the microscope 20. The microscope apparatus 40 is, for example, a laser-scanning microscope apparatus and scans the specimen with laser light to generate a microscopic image of the subject that is an example of first experiment result information and outputs it to the external storage apparatus 50. In addition, the microscope apparatus 40 generates a log of the microscope 20 that is an example of first log data and outputs it to the external storage apparatus 50.

FIG. 2 illustrates a configuration of the microscope 20 included the experiment information management system 1 as an example. The microscope 20 is, for example, a laser-scanning microscope and may include a plurality of lasers 21 (an Ar laser 21a, a HeNe-G laser 21b, a HeNe-R laser 21c), a scanning unit 22, a plurality of objectives 23, and a stage 24, as illustrated in FIG. 2. Meanwhile, the microscope 20 may have a plurality of detection channels and may be equipped with a plurality of barrier filters 25 (a barrier filter 25a, a barrier filter 25b) and a plurality of photodetectors 26 (a photodetector 26a, a photodetector 26b). The microscope 20 may be equipped with a plurality of dichroic mirrors DM 1 through DM 3 between the lasers 21 and the scanning unit 22 and may be equipped with a dichroic mirror DM 4 between the scanning unit 22 and the barrier filter 25. The microscope may further be equipped with a control unit 27 that drives the respective parts of the microscope 20 according to instructions from the microscope control apparatus 30.

The scanning unit 22 is, for example, a Galvano scanner, a resonant scanner. The objectives 23 are, for example, immersion or dry microscope objectives. The stage 24 is, for example, a motor-driven stage. The photodetector 26 is, for example, a photomultiplier tube.

Meanwhile, the microscope 20 is not limited to a laser-scanning microscope. The light source of the microscope 20 may also be a lamp light source, an LED, or the like without being limited to the laser. In addition, the photodetector of the microscope 20 may also be a photo diode included in an image sensor such as a CCD, a CMOS, or the like, without being limited to the photomultiplier tube. In addition, the observation method (microscopy) of the microscope 20 may be bright field observation, dark field observation, fluorescence observation, differential interference contrast observation, phase difference observation, and the like. Furthermore, the microscope 20 may be an upright microscope or it may also be an inverted microscope.

Figure 3:
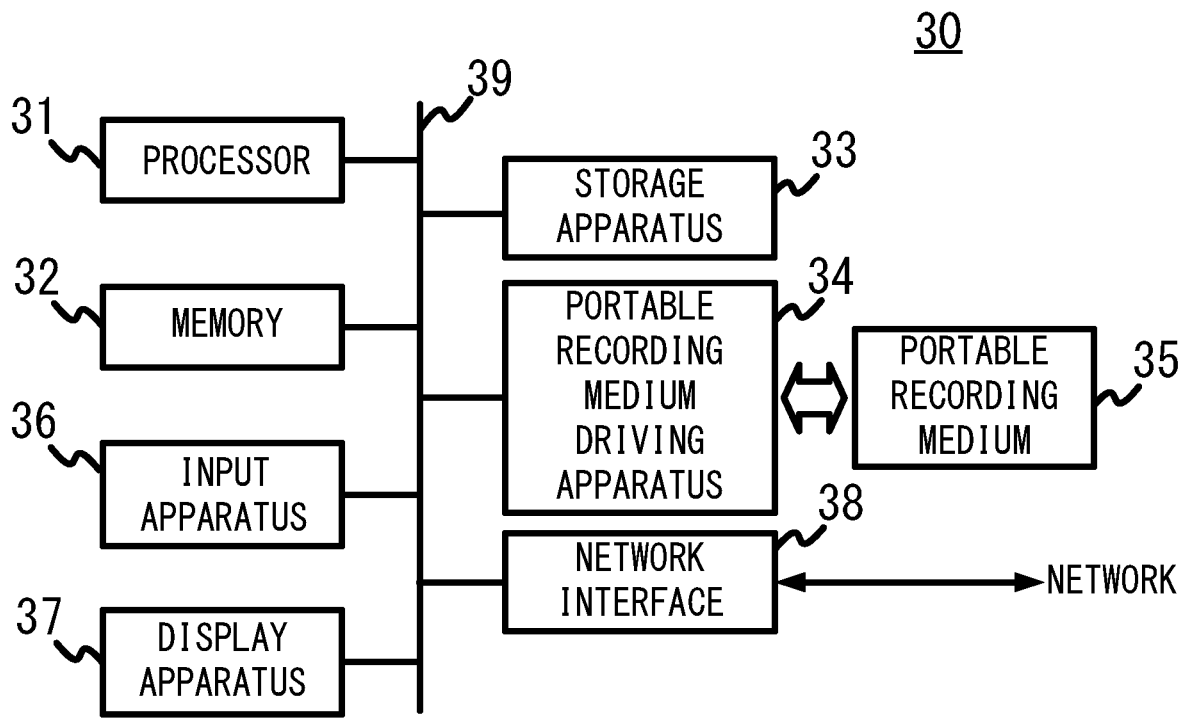
FIG. 3 illustrates a configuration of a microscope control apparatus 30 as an example.

FIG. 3 illustrates a configuration of the microscope control apparatus 30 included in the experiment information management system 1 as an example. The microscope control apparatus 30 is, for example, a standard computer. More specifically, the microscope control apparatus 30 is equipped with a processor 31, a memory 32, a storage apparatus 33, a portable recording medium driving apparatus 34 that accommodates a portable recording medium 35, an input apparatus 36, a display apparatus 37, a network interface 38, and a bus 39, as illustrated in FIG. 3. Meanwhile, the memory 32, the storage apparatus 33, and the portable recording medium 35 are respectively an example of a non-transitory computer-readable storage medium that stores a program.

The processor 31 is an arbitrary processing circuit that includes, for example, a CPU (Central Processing Unit). The processor 31 executes a program stored in the memory 32 or the storage apparatus 33 to perform the programed processes. The memory 32 is a working memory of the processor 31. The memory 32 is an arbitrary semiconductor memory such as a RAM (Random Access Memory) or the like. The storage apparatus 33 is a non-volatile memory such as an EPROM (Erasable Programmable ROM), a hard disk drive, or the like.

The portable recording medium driving apparatus 34 is able to output data stored in the memory 32 or the storage apparatus 33 to the portable recording medium 35 and is also able to read programs, data, and the like from the portable recording medium 35. The portable recording medium 35 is an arbitrary portable medium. The portable recording medium 35 includes, for example, an SD card, a USB (Universal Serial Bus) flash memory, a CD (Compact Disc), a DVD (Digital Versatile Disc), and the like.

The input apparatus 36 is, for example, a mouse, a joystick, a touch panel apparatus, and the like. The display apparatus 37 may be, for example, an organic EL display, a cathode-ray tube display, and the like.

The network interface 38 performs input and output of information to the network. As the network interface 38, an NIC (Network Interface Card), a wireless LAN (Local Area Network) card, and the like may be adopted. The bus 39 connects the processor 31, the memory 32, the storage apparatus 33, and so on in a manner in which data may be mutually exchanged.

The microscope apparatus 40 mentioned above is an example of a first experiment apparatus that generates a microscopic image as first experiment result information. Meanwhile, the first experiment apparatus of the experiment system 10 may also be a cell counter or the like that counts the number of cells, the cell density, and the like, without being limited to the microscope apparatus. In addition, the first experiment apparatus may also be an imaging apparatus that captures an image of a culture in an incubator, or the like. Meanwhile, in a case in which the first experiment apparatus is a cell counter, the first experiment result information is the number of cells, the cell density, and so on.

The external storage apparatus 50 is a recording apparatus that records the microscopic images (the first experiment result information) and the first log data generated in the microscope apparatus 40. It is, for example, a network storage (NAS) and is connected to the microscope control apparatus 30 via the network. Meanwhile, the external storage apparatus 50 is not limited to the NAS. It may be any storage apparatus that is accessible by the microscope control apparatus 30.

Figure 4:
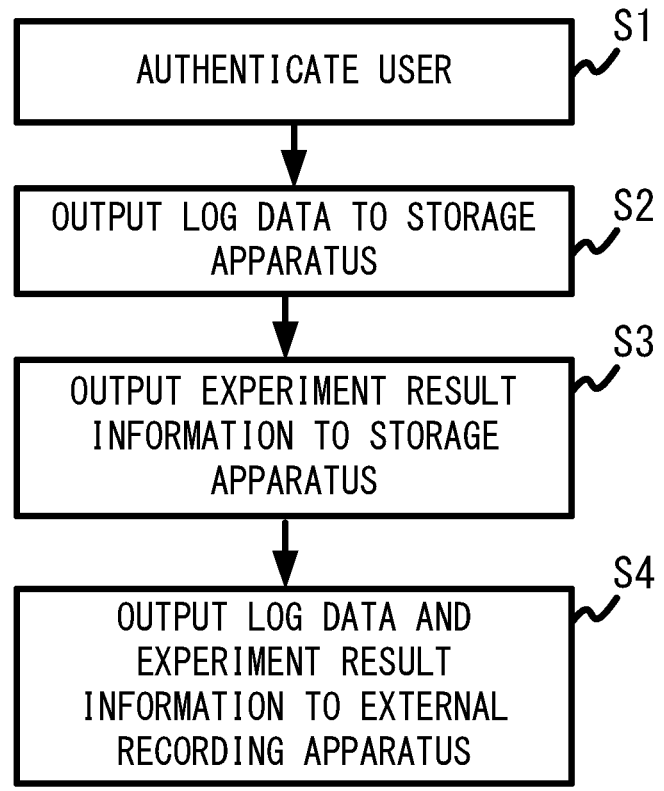
FIG. 4 is a flowchart of the processes performed in an experiment system 10.

FIG. 4 is a flowchart of the processes performed in the experiment system 10. FIG. 5 illustrates the table 50a for authentication in the experiment system 10 as an example. FIG. 6 is a drawing for explaining the timings of obtaining and recording experiment information. FIG. 7 illustrates log data 50b recorded in the external storage apparatus 50 as an example. Hereinafter, referring to FIG. 4 through FIG. 7, the processes performed in the experiment system 10 are explained. Meanwhile, the processes in FIG. 4 are performed by, for example, the processor 31 of the microscope control apparatus 30 by loading the program read out from the storage apparatus 33 onto the memory 32 and executing it.

When the experimenter accesses the experiment system 10, first, the microscope control apparatus 30 performs a user authentication process (Step S1). Here, the processor 31 authenticates the experimenter as an authorized user registered in the experiment system 10 by collating the user ID and the password input by the experimenter with information stored in the table 50a for authentication illustrated in FIG. 5. Meanwhile, the table 50a is formed in advance in the external storage apparatus 50.

After that, when the experimenter conducts an experiment using the microscope apparatus 40, the microscope apparatus 40 generates log data of the microscope 20 and outputs it to the storage apparatus 33 as first log data (Step S2). The first log data includes, for example, operation information that identifies the operation that the experimenter performed with respect to the microscope 20, but it is not limited to the operation information. For example, it may include information that identifies the microscope 20 (for example, the microscope name), information that identifies the facility in which the microscope 20 is located (for example, the facility name), information that identifies the state of the microscope 20 (for example, setting information of the microscope 20), and so on.

In Step S2, the timings at which the first log data are output to the storage apparatus 33 are, as illustrated in FIG. 6, at the time when an event occurs, at the time of polling, and so on. The first log data that indicate the switching of the objectives 23, GUI operations, or the like are output at the timing when the event occurs. In addition, regarding log data that indicate the position of the stage 24, the position of the focusing device, and the like, polling is regularly performed for the hardware, and the result of the polling is output as the first log data.

Meanwhile, when a microscopic image is generated, the microscope apparatus 40 outputs the microscopic image to the storage apparatus 33 as the first experiment result information (Step S3). Here, the first experiment result information is experiment information that the experimenter explicitly instructed to obtain. Apart from the microscopic image, for example, any measurement results obtained in the microscope apparatus 40, calculation results calculated from the microscopic image, and so on, may be included.

Further, the microscope apparatus 40 outputs, to the external storage apparatus 50, the first log data and the first experiment result information that have been output to the storage apparatus 33 (Step S4). In Step S4, when the processor 31 outputs the first log data and the first experiment result information stored in the storage apparatus 33 to the external storage apparatus 50, the external storage apparatus 50 records the first log data and the first experiment result information in a state in which they are associated with the user ID, under a directory specified by the experimenter. Meanwhile, the log data 50b illustrated in FIG. 7 is an example of first log data record in the external storage apparatus 50 and includes information of the date and time of the output, the output source, the type, the contents, and so on.

Here, the state in which they are associated with the user ID refers to the state in which it is possible to identify with which user ID they are associated. Specifically, for example, the first log data and the user ID may be associated by including the user ID in log data indicating at least the log in and log out. In this case, the first log data output between the login time and the logout time can be identified as associated with the logged-in user ID. Meanwhile, the first log data and the user ID may be associated by including the user ID in all the first log data. In addition, instead of including the user ID in the first log data, the user ID may be associated with the first log data by recording it separately from the first log data. Meanwhile, the state in which the first experiment result information is associated with the user ID may also include the state in which the first experiment result information and the user ID are associated by means of reference to the first log data, without being limited to the state in which the first experiment result information and the user ID are directly associated with each other. For example, the external storage apparatus 50 may record the first experiment result information in the state in which the first experiment result information is associated with the user ID, by including, in the first log data associated with the user ID, the path in which the first experiment result information is recorded. The association with the user ID may be performed at the timing of the output to the storage apparatus 33, or it may also be performed at the timing of the recording in the external storage apparatus 50.

Meanwhile, there are no particular limitations regarding the timing of the transfer of the first log data and the first experiment result information in Step S4. As illustrated in FIG. 6, the transfer may be performed from the storage apparatus 33 to the external storage apparatus collectively at the time of login or logout, or the transfer may be performed from the storage apparatus 33 to the external storage apparatus 50 on a real-time basis while logged in.

As described above, the experiment system 10 is able to automatically output the first log data and the first experiment result information to the external storage apparatus 50 during the period from the log in of the experimenter to the experiment system 10 to the log out. In addition, the experiment system 10 is able to record the first log data and the first experiment result information in a state in which they are associated with the user ID, in the external storage apparatus 50.

Next, the experiment note system 100 is explained. The experiment note system 100 is a system that generates and displays electronic experiment notes and includes a server 110 and a server 120, as illustrated in FIG. 1. The server 110 is an example of an experiment note generation apparatus of the experiment note system 100 and generates an experiment note according to at least the first experiment result information and the first log data recorded in the external storage apparatus 50. Here, an experiment note is the record of an experiment to be a material proof that the experiment has been conducted and are also the records that indicates what experiment has been conducted and what results have been obtained as a consequence. Specifically, the experiment notes include at least the following three kinds of information, (1) the date on which the experiment is conducted, (2) the parameters of the experiment apparatus (for example, the parameters of the microscope), and (3) information that identifies the file generated in the experiment apparatus (for example, a file name or the like). Meanwhile, the experiment note may further include the name of the experimenter, the name of the facility, information obtained from other apparatuses (for example, the vital information of the specimen, the $CO_2$ concentration, information of the culture medium, and so on). In addition, it is desirable that the experiment notes are not a simple list of experiment information but is analyzed and organized experiment information. The server 120 is an example of a display screen generation apparatus of the experiment note system 100 and generates an experiment note display screen according to at least the experiment note.

Figure 8:
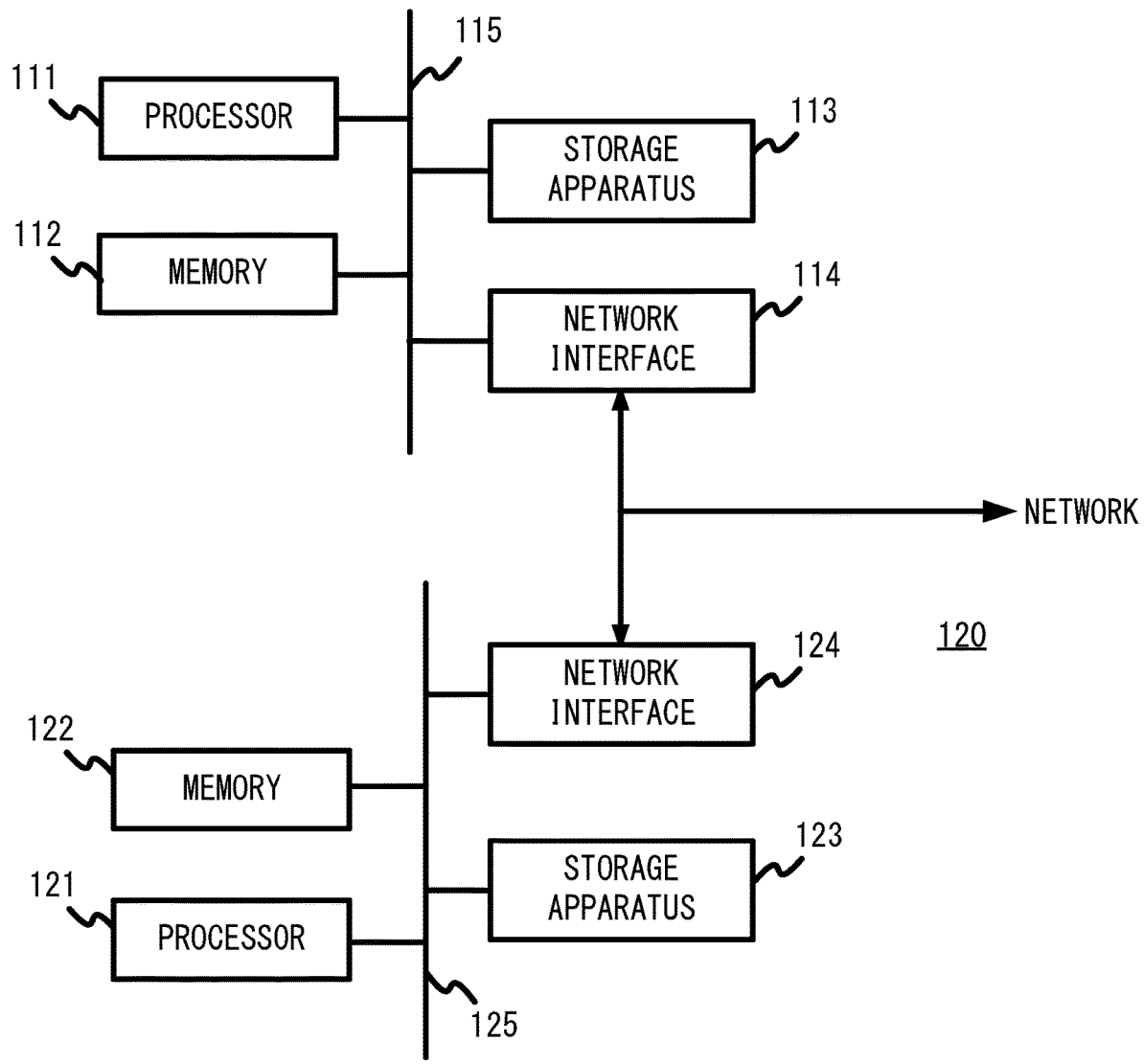
FIG. 8 illustrates a configuration of an experiment note system 100 as an example.

FIG. 8 illustrates a configuration of the experiment note system 100 as an example. The server 110 and the server 120 are, for example, a standard computer. More specifically, the server 110 includes a processor 111, a memory 112, a storage apparatus 113, a network interface 114, and a bus 115, as illustrated in FIG. 8. Meanwhile, the server 120 includes a processor 121, the memory 122, the storage apparatus 123, a network interface 124, and a bus 125, as illustrated in FIG. 8. Meanwhile, the memory 112, the storage apparatus 113, the memory 122, and the storage apparatus 123 are respectively an example of a non-transitory computer-readable storage medium that stores a program.

The processor 111 and the processor 121 are, for example, an arbitrary processing circuit that includes a CPU (Central Processing Unit). The processor 111 and the processor 121 execute a program stored in the memory (the memory 112, the memory 122) or the storage apparatus (the storage apparatus 113, the storage apparatus 123) to perform the programed processes.

The memory 112 is a working memory of the processor 111, and the memory 122 is a working memory of the processor 121. The memory 112 and the memory 122 are an arbitrary semiconductor memory such as a RAM (Random Access Memory) or the like. The storage apparatus 113 and the storage apparatus 123 are a non-volatile memory such as an EPROM (Erasable Programmable ROM), a hard disk drive, or the like.

The network interface 114 and the network interface 124 perform input and output of information to the network. As the network interface 114 and the network interface 124, an NIC (Network Interface Card), a wireless LAN (Local Area Network) card, and the like may be adopted. The bus 115 and the bus 125 connect the respective parts of the servers in a manner in which data may be mutually exchanged.

FIG. 9 is a flowchart of the experiment notes generation process performed in the experiment note system 100. Hereinafter, referring to FIG. 9, the experiment notes generation process that is an example of the experiment information management method of the experiment note system 100 is explained. The experiment notes generation process illustrated in FIG. 9 is performed by, for example, the processor 111 of the server 110 by loading the program read out from the storage apparatus 113 onto the memory 112 and executing it. This program is, for example, a program of batch processing and is executed at a prescribed date and time (for example, weekday nights).

When the experiment notes generation process starts, first, the server 110 reads data from the external storage apparatus 50 (Step S11). Here, the processor 111 accesses the external storage apparatus 50 through the network interface 114 and reads out the first log data and the first experiment result information from the external storage apparatus 50. That is, the network interface 114 is an example of an obtaining unit of experiment note generation apparatus that obtains the first log data and the first experiment result information generated in the microscope apparatus 40.

Next, the server 110 classifies the data by identification information (Step S12). Here, the identification information is the user ID being user identification information that identifies the user of the experiment system 10. Meanwhile, in the case in which the first log data and the first experiment result information associated with the user ID are stored in a different directory for each user ID as described above, the processor 111 classifies the first log data and the first experiment result information by the user ID by reading out the first log data and the first experiment result information for each directory. Meanwhile, in a case in which the storage is not made in a different directory for each user ID, the processor 111 identifies the user ID associated with the first log data and the first experiment result information according to a prescribed rule and classifies the first log data and the first experiment result information by the user ID.

After that, the server 110 generates an experiment note for each identification information, using the data classified by the identification information (Step S13). Here, the processor 111 generates an experiment note for each user ID by generating an experiment note using the first log data and the first experiment result information associated with the same user ID. That is, the processor 111 is an example of a generating unit of the experiment note generation apparatus that generates an experiment note according to at least the first experiment result information and the first log data.

Lastly, the server 110 records the generated experiment note (Step S14). Here, the processor 111 records the experiment notes generated for each user ID in the storage apparatus 113. Meanwhile, the experiment note may also be registered in a database built in the storage apparatus 113. Accordingly, it becomes possible to easily restrict the access to and update of the experiment note, and so on.

As described above, the experiment note system 100 is able to automatically generate and record an experiment note according to the first log data and the first experiment result information generated in the microscope apparatus 40.

Figure 10:
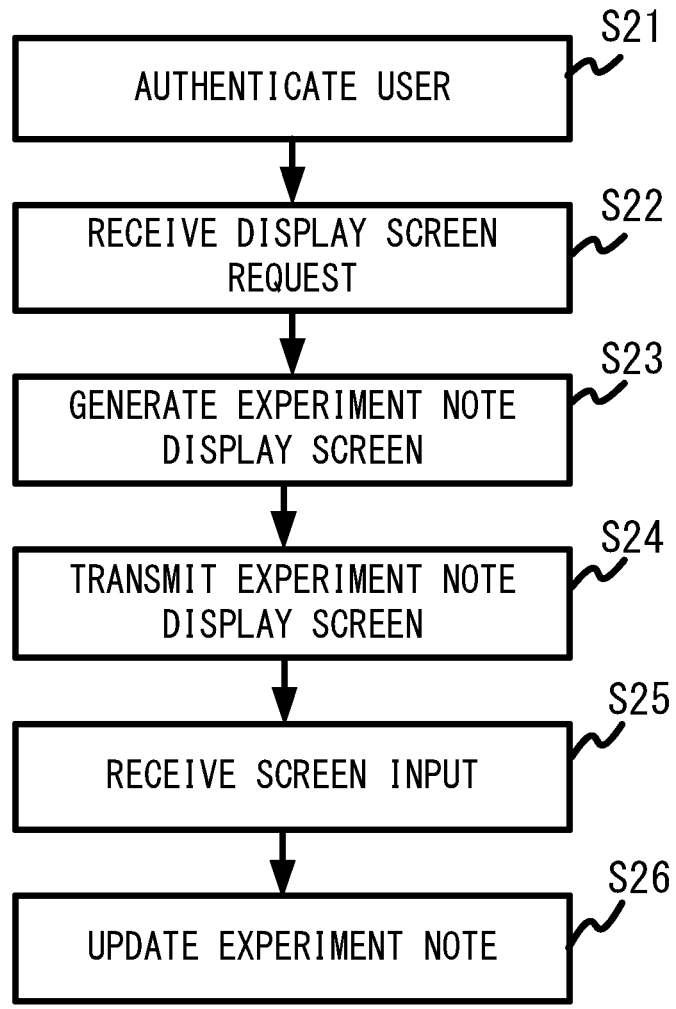
FIG. 10 is a flowchart of a display screen generation process performed in the experiment note system 100.
Figure 12:
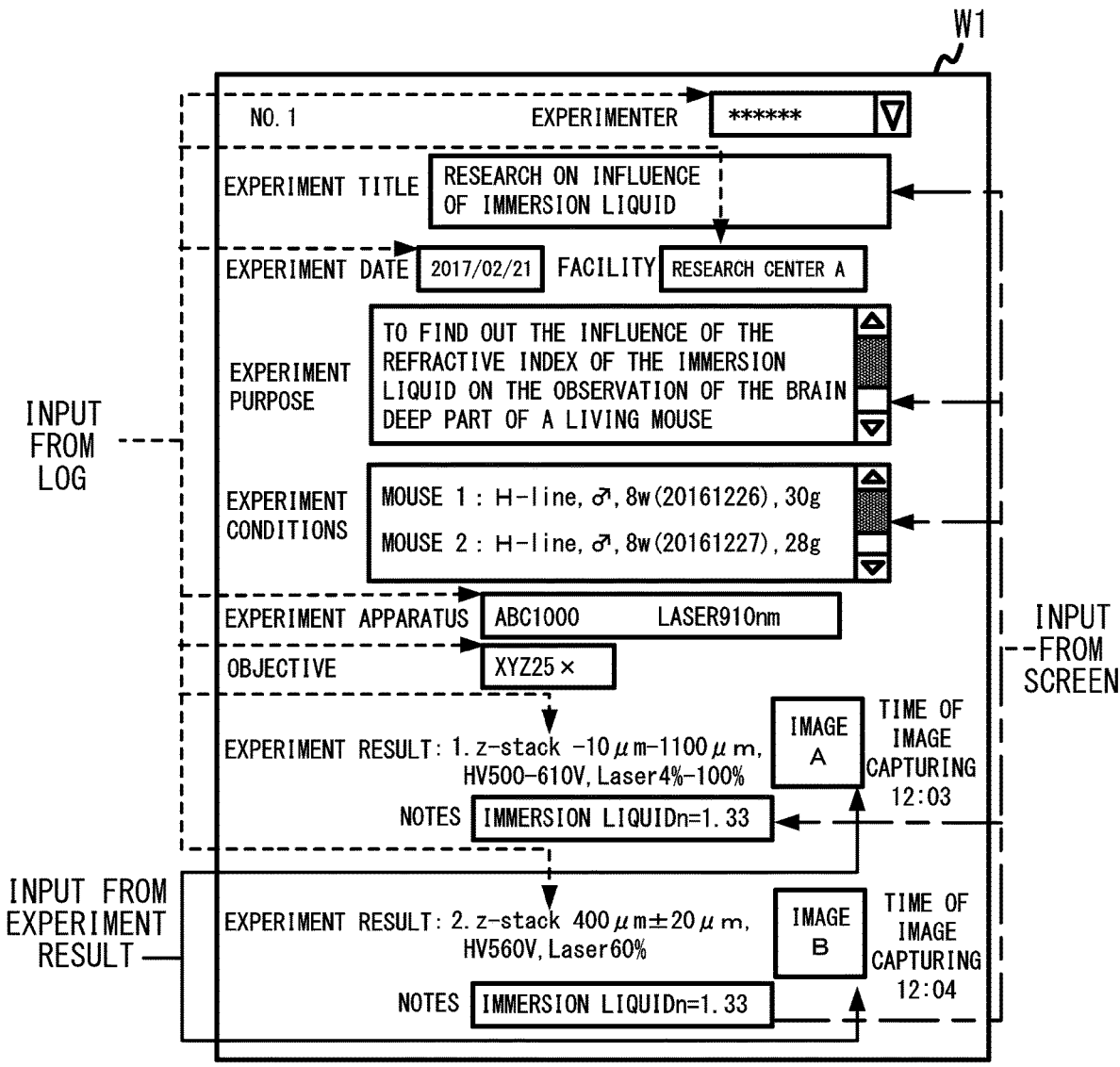
FIG. 12 illustrates an example of an experiment note display screen.

FIG. 10 is a flowchart of the display screen generation process performed in the experiment note system 100. FIG. 11 illustrates a table 113a for authentication permission control of the experiment note system 100 as an example. FIG. 12 illustrates an example of the experiment note display screen. Hereinafter, referring to FIG. 10 through FIG. 12, the display screen generation process that is an example of the information management method of the experiment note system 100 is explained. Meanwhile, the display screen generation process illustrated in FIG. 10 is performed by, for example, the processor 121 of the server 120 by loading the program read out from the storage apparatus 123 onto the memory 122 and executing it. The program is, for example, a Web application program, executed in response to HTTP requests from client terminals (a client terminal 2, a client terminal 3). The client terminals are, for example, a stationary computer, but it may also be a laptop computer, a tablet computer, a smartphone, and the like.

When the experimenter or a related person (hereinafter, simply referred to as a user) accesses the experiment note system 100 using the client terminal 2 for example, first, the server 120 performs a user authentication process (Step S21). Here, the processor 121 authenticates the user as an authorized user registered in the experiment note system 100 by collating the user ID and the password input by the user with information stored in the table 113a for authentication permission control illustrated in FIG. 11 and further gives authority with respect to the experiment note system 100. The user is allowed to access experiment notes within the scope according to the given access authority. The user is allowed to update experiment notes within the scope according to the given update authority.

When the authenticated user selects experiment notes to be displayed, the server 120 receives a display screen request (Step S22) and generates an experiment note display screen (Step S23). In Step S23, for example, in a case in which the experiment note of an experiment conducted by the user ID "10000001" has been requested, the processor 121 identifies the experiment note corresponding to the user ID "10000001" and generates the experiment note display screen according to the identified experiment note.

The experiment note display screen displays prescribed information (the name of the experimenter, the title of the experiment, the date of the experiment, the facility for the experiment, the purpose of the experiment, the conditions of the experiment, the name of the experiment apparatus, the name of the objective, the results of the experiment, notes, microscopic images) as in the screen W1 in FIG. 12. In the fields for displaying the name of the experimenter, the date of the experiment, the facility for the experiment, the name of the experiment apparatus, the name of the objective, the results of the experiment among the above information items, for example, information generated according to the log data included in the experiment note is displayed. Meanwhile, in the field for displaying microscopic images, the microscopic images included in the experiment note are displayed. The other fields (the title of the experiment, the purpose of the experiment, the conditions of the experiment, notes) are displayed as blank fields.

Upon generating the experiment note display screen, the server 120 transmits the generated experiment note display screen to the client terminal 2 (Step S24). Accordingly, the screen W1 illustrated in FIG. 12 is displayed in the display unit of the client terminal 2.

After that, when a user who has update authority inputs information in the input field of the screen W1 (the title of the experiment, the purpose of the experiment, the conditions of the experiment, notes), the server 120 receives the information input to the screen W1 (Step S25) and updates the experiment note according to at least the received information (Step S26). Here, the processor 121 accesses the storage apparatus 113 through the storage apparatus 123 and updates the experiment note.

As described above, the experiment note system 100 is able to generate the experiment note display screen upon the request from the client terminal according to the experiment note generated in advance by the experiment note generation apparatus and to display the experiment note display screen on the client terminal.

In the experiment note system 100 according to the present embodiment, for the experimenter, the experiment note is automatically generated as to the experiment is conducted using the experiment apparatus as usual. For this reason, it becomes possible for the experimenter to conduct the experiment without worrying about omissions of records and to focus on the experiment more than before. In addition, since the work load for keeping the records of experiment notes is reduced, it also becomes possible to conduct multiple experiments parallelly in terms of time. In addition, for example, in some cases such as when the experiment is conducted in a dark room where the light cannot be turned on for recording notes, it becomes possible to avoid situations where it is impossible to record experiment notes because of restrictions due to the experiment environment.

Furthermore, in the experiment note system 100, the experiment note is generated from information collected broadly using the log data of the experiment apparatus in addition to the experiment result information that is experiment information for which the experimenter has explicitly given instruction. Accordingly, experiment notes with enhanced description items can be obtained. In addition, it is also very useful that experiment notes with standardized description items regardless of the experimenter and the purpose of the experiment can be obtained. In a comparison with conventional experiment notes in this regard, conventionally, in the experiment note N2 of an experiment focusing on the brightness (for example, an experiment 2), information that influences the brightness, such as the intensity of the excitation light, the sensitivity of the detector, and so on (see the field R2 in FIG. 13) are included as illustrated in FIG. 13, whereas in the experiment note N1 of an experiment focusing on the shape (for example, an experiment 1), information that influences the brightness is often not recorded. For this reason, it is difficult to compare experiment with different purposes in many cases, and effective utilization of experiment notes tend to be restricted. By contrast, with the experiment note generated in the experiment note system 100, entry items are standardized, and therefore, it becomes possible to compare any experiments regardless of the purpose of the experiment.

As described above, according to the experiment note system 100, it becomes possible to generate experiment notes that may be effectively utilized, while reducing the burden of experimenters. In addition, by the digitization of experiment notes, it becomes possible to publish experiment notes in the state in which browsing and update are restricted by the computer system. For this reason, there will be less hesitation in publishing experiment notes, and it becomes possible to suppress situations where related people other than the experimenter are unable to know the location of experiment notes and unable to utilize the experiment notes.

FIG. 14 illustrates another example of the experiment note display screen. In FIG. 12, an experiment note display screen that includes microscopic images is illustrated as an example, but the experiment note display screen does not have to include microscopic images themselves, as long as it includes fields for displaying the first experiment result information.

For example, in an experiment information management system 1 that includes a cell counter instead of the microscope apparatus 40 as the experiment apparatus, a screen W2 that includes a field (see the field R21 in FIG. 14) that displays the number of cells as the first experiment result information as illustrated in FIG. 14 may be displayed as the experiment note display screen.

FIG. 15 illustrates an example of an experiment selection screen. While an example in which the experiment note is generated for each user ID is illustrated, the experiment note may also be generated for each experiment. That is, using experiment identification information that identifies experiments instead of the user ID, the server 110 being the experiment note generation apparatus may generate an experiment note for each experiment identification information.

However, in studies, it depends on the experimenter what range is to be considered as one experiment. Therefore, when the experiment identification information is used as identification information, on the screen W3 in FIG. 15 displayed after the experimenter logs in to the experiment system 10, the experimenter may be prompted to choose the experiment. Accordingly, it becomes possible for the experiment system to determine experiment identification information according to the operation of the experimenter who is the user of the microscope apparatus 40, and the external storage apparatus 50 may record the first experiment result information and the first log data in a state in which they are associated with the experiment identification information. Therefore, the server 110 being the experiment note generation apparatus is able to generate an experiment note for each experiment in units of experiments recognized by the experimenter.

Figure 16:
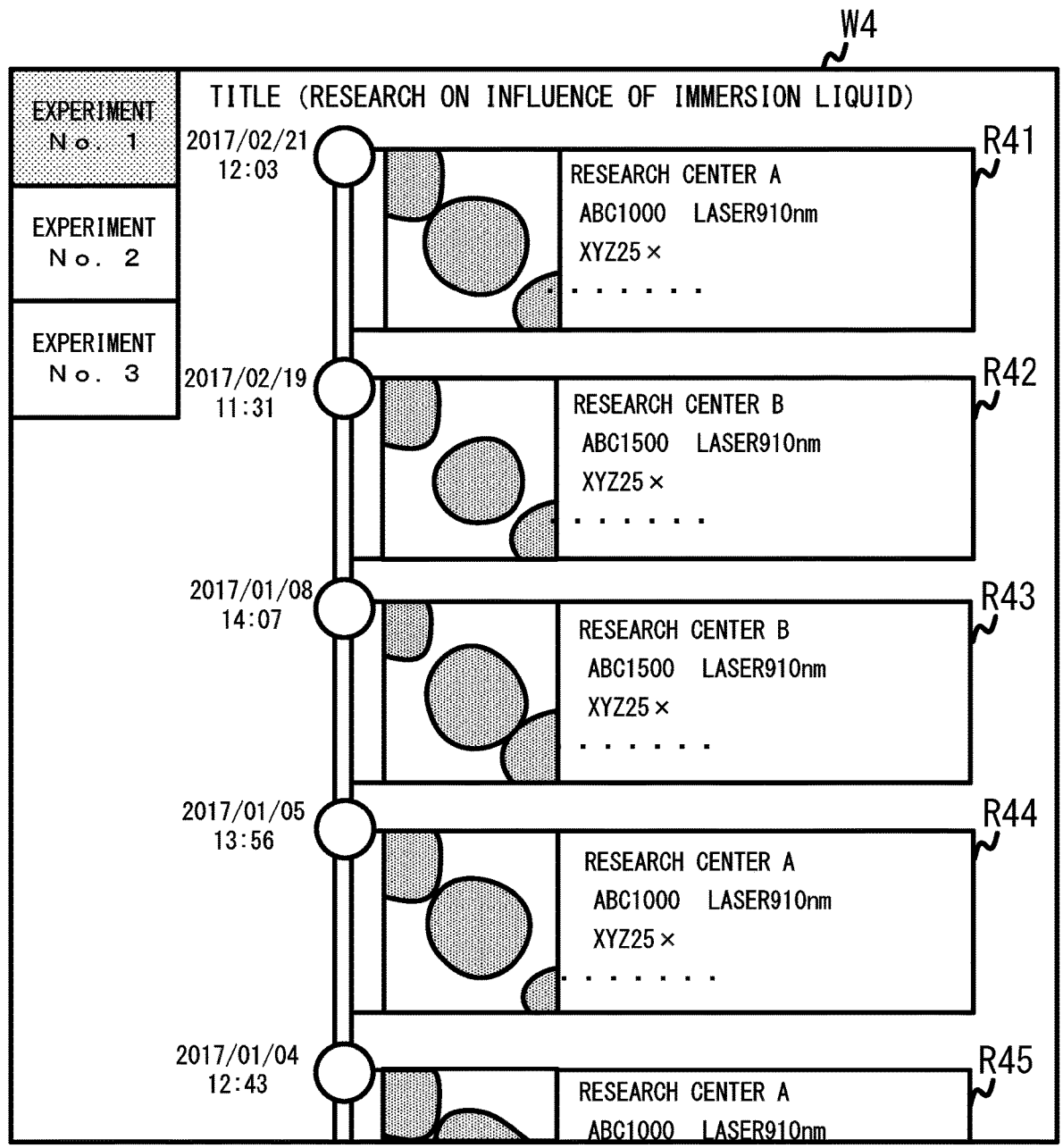
FIG. 16 illustrates yet another example of an experiment note display screen.

FIG. 16 illustrates yet another example of the experiment note display screen. The server 120 being the display screen generation apparatus may generate the experiment note display screen that displays an experiment while segmenting it on a timeline, as illustrated in the screen W4 of FIG. 16. In response to the selection of one of the fields arranged on the timeline (fields R41 through R45), the server 120 may generate an experiment note display screen that displays the details of the experiment conducted on the selected date and time.

Figure 17:
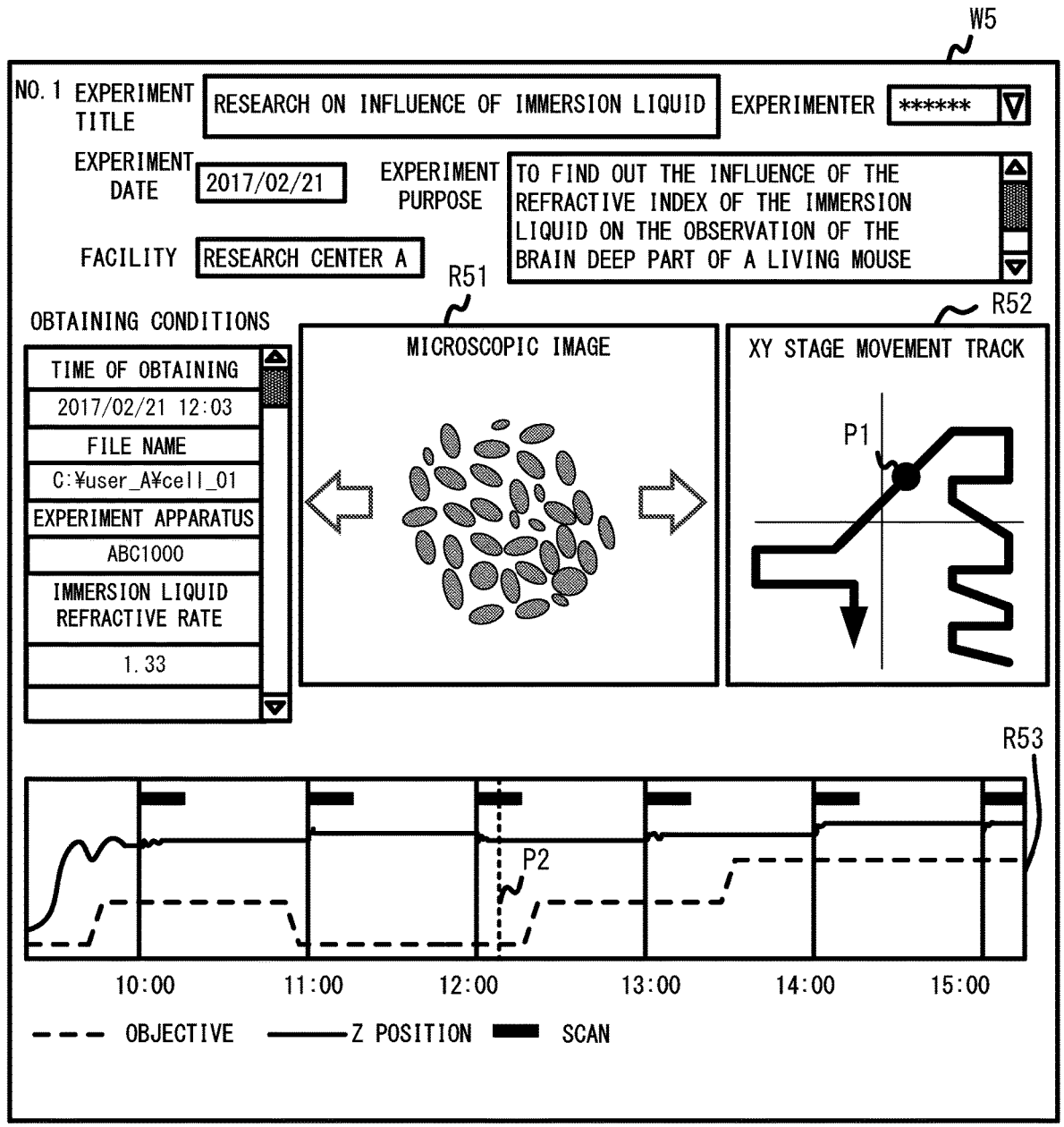
FIG. 17 illustrates yet another example of an experiment note display screen.

FIG. 17 illustrates yet another example of the experiment note display screen. FIG. 18 is a drawing for explaining how to use the experiment note display screen illustrated in FIG. 17. The server 120 may generate, according to at least an experiment note generated in the server 110, an experiment note display screen (screen W5) as illustrated in FIG. 17 that includes a field R51 for displaying microscopic images being the first experiment result information and fields (field R52, field R53) for graphically displaying the temporal change of the state of the microscope apparatus 40 being the first experiment apparatus. The field R52 and the field R53 are generated according to at least time-series data included in the experiment note. More specifically, the field R52 and the field R53 are generated according to the time-series data being time-series data included in the experiment note in the period that includes an obtaining period for obtaining the microscopic image and that is longer than the obtaining period.

In the field R52, the track of the movement of the stage 24 in the XY direction (the direction orthogonal to the optical axis of the objective 23) is drawn. The point P1 in the field R52 is indicates the position of the stage 24 at the time when the microscopic image displayed in the field R51 is obtained. Meanwhile, in the field R53, graphs that indicates the switching operation of the objectives by the revolver (broken line), the focusing operation of the focusing apparatus (solid line), and the obtaining period for obtaining the microscopic image (thick solid line) are drawn. The point P2 in the field R53 indicates the time at which the microscopic image displayed in the field R51 is obtained.

Conventionally, the work load is very large even just for recording the state of the microscope apparatus at the time when the microscopic image is obtained, and therefore, detailed operation history is not recorded in experiment notes. For this reason, it is not possible to know the experiment procedure and detailed operations of the experiment apparatus from conventional experiment notes. By contrast, in the experiment note system 100, as illustrated in FIG. 17, it is possible to generate an experiment note display screen that includes a field for graphically displaying the temporal change of the state of the first experiment apparatus (especially, the temporal change in the period that is longer than the image obtaining period). For this reason, it is possible to accurately understand in what procedures the experimenter conducted the experiment and how the experiment apparatus operated to obtain the experiment result information (the microscopic image).

Accordingly, it also becomes possible to use experiment notes as technical materials explaining the experiment procedures in detail, and they may be used for transferring of technology and skills, and for the education of researchers. They may also be materials for discussion for improving experiment procedures. In addition, with experiment procedures recorded in detail, it also becomes easy to prove the reproductivity of experiments by reproductive experiments. Therefore, it also becomes possible to increase the reliability of experiment results. Furthermore, when results of experiments conducted multiple times are different, they may be used for investigating the cause. For example, as illustrated in FIG. 18, identifying the different in the state of the experiment apparatus in two experiments, it becomes possible to effectively study the cause of the difference in the experiment results. Here, comparing FIG. 18A and FIG. 18B, the objective in the image capturing started at 11 o'clock is identified as different (see the field A and the field B).

FIG. 19 illustrates yet another example of the experiment note display screen. FIG. 20A and FIG. 20B are a drawing for explaining how to use the experiment note display screen illustrated in FIG. 19. In a case in which measurement result output from a sensor S mounted on the mouse M (see FIG. 2) has been recorded, the server 110 may generate an experiment note according to at least a microscopic image and first log data generated in the microscope apparatus 40, as well as the measurement result output from the sensor S. Meanwhile, the sensor S is, for example, an electrocardiogram device.

The server 120 may generate, according to at least an experiment note generated in the server 110, an experiment note display screen (screen W6) as illustrated in FIG. 19 that includes a field (field R62) for graphically displaying the temporal change of the state of the microscope apparatus 40 and a field (field R63) for graphically displaying the temporal change of the state of the microscope apparatus 40 and the temporal change of the state of the mouse M. The field R62 and the field R63 are generated according to at least time-series data included in the experiment note. More specifically, the field R62 and the field R63 are generated according to the time-series data being time-series data included in the experiment note in the period that includes an obtaining period for obtaining the microscopic image and that is longer than the obtaining period.

The field R62 is similar to the field R52 illustrated in FIG. 17, and therefore, the explanation is omitted. The field R63 differs from the field R53 illustrated in FIG. 17 in that the electrocardiogram waveform (solid line) is additionally drawn according to the measurement result output from the sensor S.

By generating the experiment note display screen illustrated in FIG. 19, a similar effect is also obtained in the case in which the experiment note display screen illustrated in FIG. 17 is generated. Furthermore, with information obtained apart from the first experiment apparatus operated by the experimenter being included in experiment notes, it becomes possible to understand the experiment result more accurately. For example, as illustrated in FIGS. 20A and 20B, by identifying the difference in the states of the specimen in the two experiments, it is possible to study the possibility that the cause of the difference is not in the experiment procedure but in the state of the specimen. Here, comparing FIG. 20A and FIG. 20B, the heart rate of the specimen in the image capturing started at 12 o'clock is identified as different (see the field C and the field D). In addition, the difference may also be identified not only in the momentary heart rate but also in matters such as whether the heart rate is stable in the period or is changing in the period.

Second Embodiment

Figure 21:
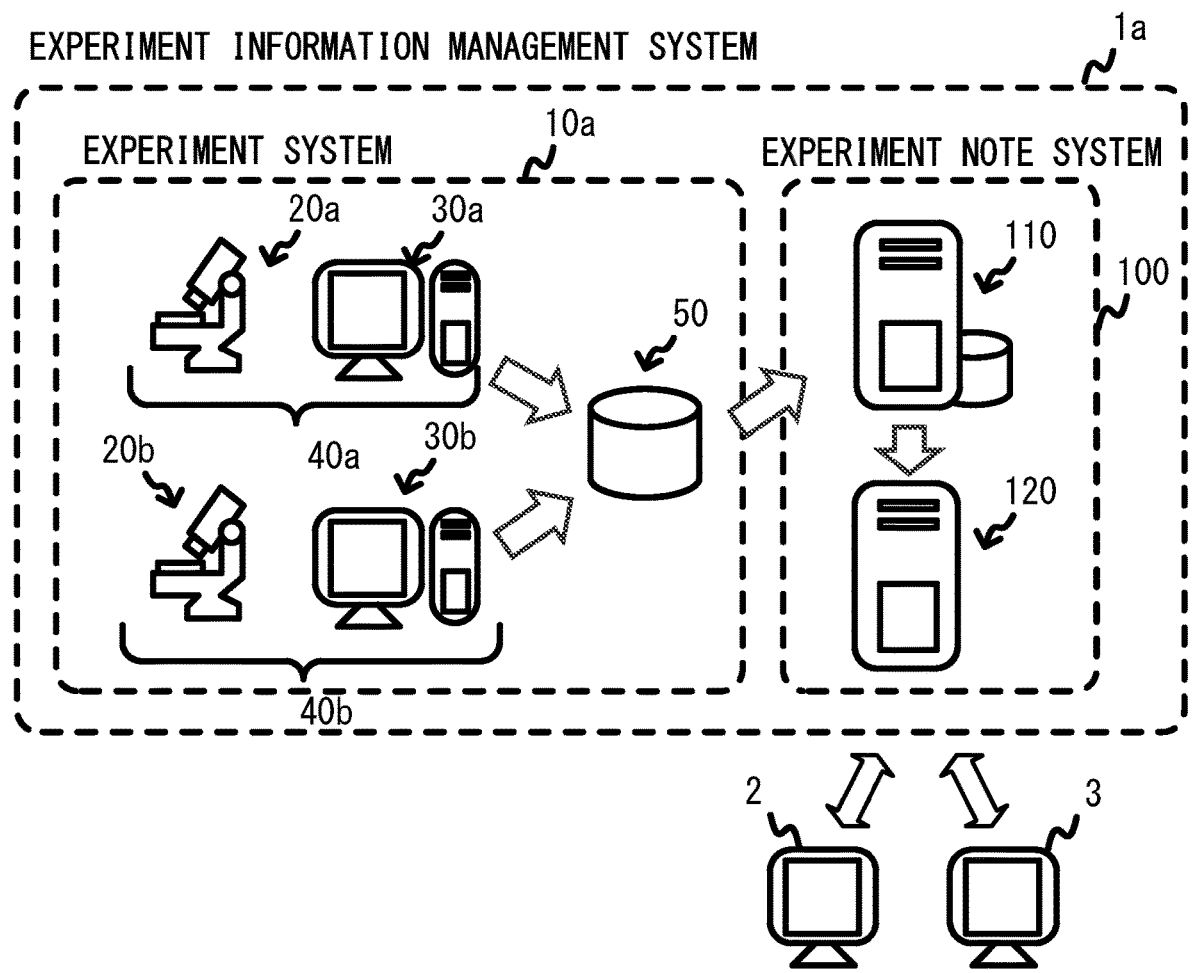
FIG. 21 illustrates a configuration of an experiment information management system 1a according to the second embodiment as an example.

FIG. 21 illustrates a configuration of an experiment information management system 1a according to the present embodiment as an example. The experiment information management system 1a illustrated in FIG. 21 differs from the experiment information management system 1 illustrated in FIG. 1 in that it includes an experiment system 10a instead of the experiment system 10.

The experiment system 10a differs from the experiment system 10 in that it includes a plurality of microscope apparatuses (a microscope apparatus 40a, a microscope apparatus 40b) that are respectively an experiment apparatus. The microscope apparatus 40a is a first experiment apparatus of the experiment system 10a and is similar to the microscope apparatus 40 illustrated in FIG. 1. The microscope apparatus 40b is a second experiment apparatus of the experiment system 10a that is different from the microscope apparatus 40a. The microscope apparatus 40b generates second experiment result information and second log data. In the present embodiment, it is preferable that identification information that identifies the experiment apparatus is included in log data. Meanwhile, the identification information that identifies the experiment apparatus may also be included in log data in the first embodiment.

The external storage apparatus 50 records the first experiment result information and the first log data in the state in which they are associated with identification information such as the user ID and also records the second experiment result information and the second log data in the state in which they are associated with the identification information.

Accordingly, in the experiment information management system 1a, the server 110 is able to classify the first experiment result information, the first log data, the second experiment result information and the second log data by identification information and to generate an experiment note for each identification information.

According to the experiment information management system 1a, an effect similar to that of the experiment information management system 1 may also be obtained. In addition, in experiment information management system 1a, an experiment note may be generated in a manner in which experiments conducted using different experiment apparatuses are put together. For example, in a case in which a surgical operation is performed using a stereoscopic microscope being the first experiment apparatus, and after that, the specimen is observed using a fluorescence microscope being the second experiment apparatus, by creating the records of the experiments conducted using the two experiment apparatuses as one experiment note, it becomes possible to learn matters such as that the difference in the amount of bleeding in the surgical operation causes a difference in the subsequence progress.

Third Embodiment

Figure 22:
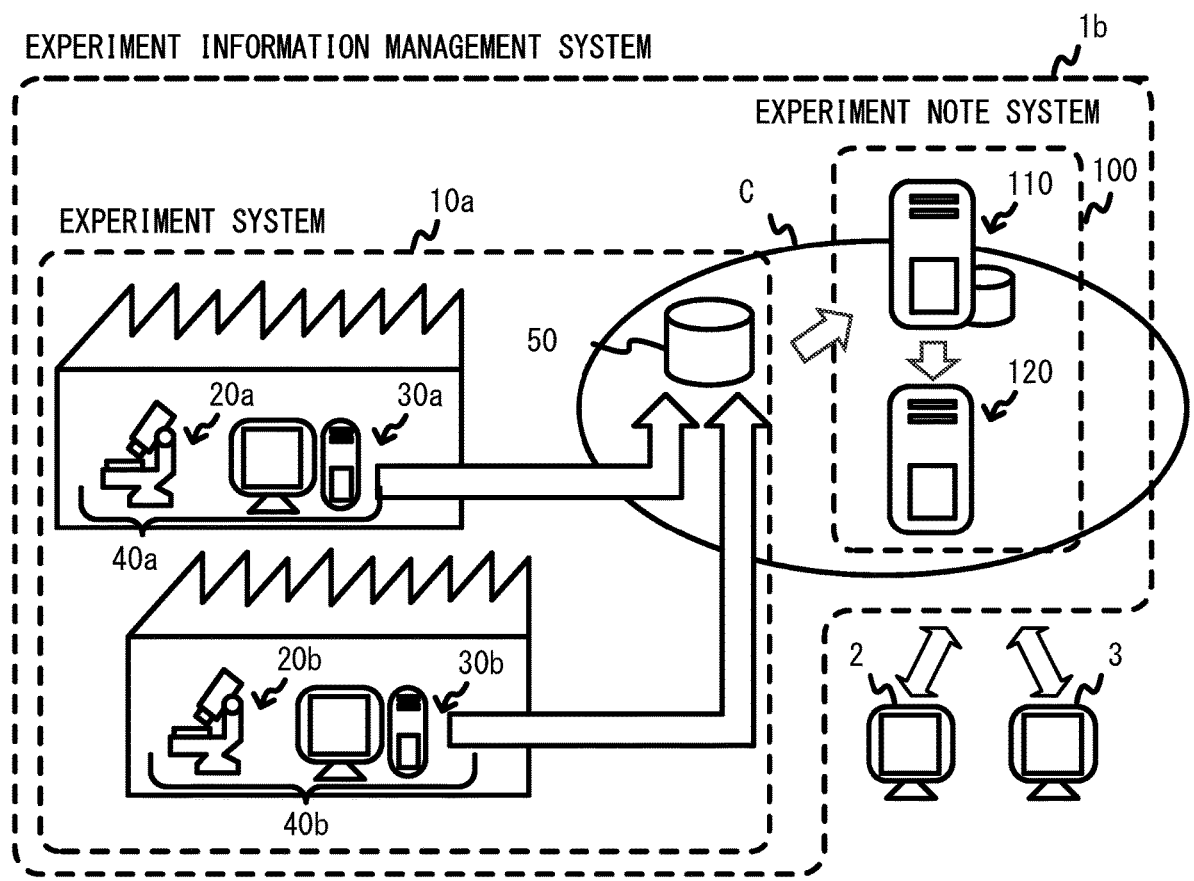
FIG. 22 illustrates a configuration of an experiment information management system 1b according to the third embodiment as an example.

FIG. 22 illustrates a configuration of an experiment information management system 1b according to the present embodiment. The experiment information management system 1b differs from the experiment information management system 1a in that a plurality of experiment apparatuses are located in different facilities from each other, and the external storage apparatus 50 and the experiment note system 100 are provided as a cloud service. That is, at least part of transmission lines between each of the plurality of the experiment apparatuses and the external storage apparatus 50 is the Internet. In the present embodiment, it is desirable that identification information that identifies the experiment apparatus and identification information that identifies the facility are included in log data. Meanwhile, the identification information that identifies the experiment apparatus and the facility may also be included in log data in the second embodiment. Other points are similar to the experiment information management system 1a illustrated in FIG. 21.

According to the experiment information management system 1b, an effect similar to that of the experiment information management system 1a may also be obtained. In addition, in the experiment information management system 1b, unlike the experiment information management system 1a that is equipped with the on-premise external storage apparatus 50, the external storage apparatus 50 is located on the cloud, making it possible to easily put together, in one experiment note, the records of experiments conducted with a plurality of experiment apparatuses placed in different facilities (that is, different locations). In addition, with the experiment note system 100 being placed on the cloud, as long as being connected with the Internet, it is possible to access the experiment note system 100 from any location to browse experiment notes.

The embodiments described above present specific examples for facilitating the understanding of the invention, and embodiments of the present invention are not limited to them. A part of the embodiments described above may be applied to other embodiments. The experiment information management system, the experiment note system, the experiment note generation apparatus, the screen generation apparatus, the experiment information management method, and the computer-readable medium may be modified and changed in various ways within the scope of the claims. For example, the server 110 and the server 120 may be a single apparatus rather than being separate apparatuses. Meanwhile, the external storage apparatus 50 may be the storage apparatus 113 of the server 110. In addition, the microscope apparatus 40 may access information source that provides weather information, and the external storage apparatus 50 may record weather information obtained by the microscope apparatus 40 as log data.

What is claimed is:

1. An experiment information management system comprising:
    a first experiment apparatus configured to generate first experiment result information and first log data;
    a recording apparatus configured to record the first experiment result information and the first log data generated in the first experiment apparatus;
    an experiment note generation apparatus configured to generate an experiment note being a record of an experiment, according to at least the first experiment result information and the first log data recorded in the recording apparatus; and
    a screen generation apparatus configured to generate an experiment note display screen according to at least the experiment note,
    wherein:
    the first experiment apparatus comprises a microscope apparatus configured to generate a microscopic image of a specimen, the microscopic image being the first experiment result information, the experiment note display screen includes a first field for displaying the microscopic image and a second field for graphically displaying a temporal change of a state of the first experiment apparatus, and the second field is generated according to at least time-series data included in the experiment note, the time-series data being for a period that includes an obtaining period for obtaining the microscopic image and that is longer than the obtaining period.

2. The experiment information management system according to claim 1, wherein:

the recording apparatus records the first experiment result information and the first log data in a state in which the first experiment result information and the first log data are associated with identification information, and the experiment note generation apparatus:

classifies, by the identification information, the first experiment result information and the first log data recorded in the recording apparatus; and generates the experiment note for each identification information.

3. The experiment information management system according to claim 2, further comprising:

a second experiment apparatus that is different from the first experiment apparatus and that is configured to generate second experiment result information and second log data, wherein:

the recording apparatus records the second experiment result information and the second log data in a state in which the second experiment result information and the second log data are associated with the identification information, and the experiment note generation apparatus:

classifies, by the identification information, the first experiment result information, the first log data, the second experiment result information, and the second log data recorded in the recording apparatus; and generates the experiment note for each identification information.

4. The experiment information management system according to claim 3, wherein the identification information comprises user identification information that identifies a user of the first experiment apparatus.

5. The experiment information management system according to claim 3, wherein:

the identification information comprises experiment identification information that identifies an experiment; and the experiment identification information is determined according to an operation of a user of the first experiment apparatus.

6. The experiment information management system according to claim 3, wherein each of the first experiment apparatus and the second experiment apparatus comprises a network interface for connecting to a network and is configured to record the first log data and the second log data, via the network, in the recording apparatus connected to the network.

7. The experiment information management system according to claim 6, wherein the network includes Internet at least as a part of transmission lines between each of the first experiment apparatus and the second experiment apparatus and the recording apparatus.

8. The experiment information management system according to claim 2, wherein the identification information comprises user identification information that identifies a user of the first experiment apparatus.

9. The experiment information management system according to claim 2, wherein:

the identification information comprises experiment identification information that identifies an experiment; and the experiment identification information is determined according to an operation of a user of the first experiment apparatus.

10. The experiment information management system according to claim 1, wherein the experiment note generation apparatus updates the experiment note according to at least information input to the experiment note display screen.

11. An experiment information management system comprising:

a first experiment apparatus configured to generate first experiment result information and first log data;

a recording apparatus configured to record the first experiment result information and the first log data generated in the first experiment apparatus;

an experiment note generation apparatus configured to generate an experiment note being a record of an experiment, according to at least the first experiment result information and the first log data recorded in the recording apparatus; and a screen generation apparatus configured to generate an experiment note display screen according to at least the experiment note, wherein:

the first experiment apparatus comprises a microscope apparatus configured to generate a microscopic image of a specimen, the microscopic image being the first experiment result information;

the experiment note generation apparatus generates the experiment note according to at least the microscopic image, the first log data, and a measurement result output from a sensor configured to output information related to the specimen;

the experiment note display screen includes a field for displaying the microscopic image and a field for graphically displaying a temporal change of a state of the first experiment apparatus and a temporal change of a state of the specimen; and the field for graphically displaying is generated according to at least time-series data included in the experiment note, the time-series data being for a period that includes an obtaining period for obtaining the microscopic image and that is longer than the obtaining period.

* * * * *